No. 783,498. PATENTED FEB. 28, 1905.
E. ARNOLD & F. COLLISCHONN.
EQUIPOTENTIAL CONNECTIONS FOR ARMATURES FOR DYNAMOS
WITH WAVE WINDING.
APPLICATION FILED JUNE 8, 1901.

No. 783,498. PATENTED FEB. 28, 1905.
E. ARNOLD & F. COLLISCHONN.
EQUIPOTENTIAL CONNECTIONS FOR ARMATURES FOR DYNAMOS
WITH WAVE WINDING.
APPLICATION FILED JUNE 8, 1901.

No. 783,498. PATENTED FEB. 28, 1905.
E. ARNOLD & F. COLLISCHONN.
EQUIPOTENTIAL CONNECTIONS FOR ARMATURES FOR DYNAMOS
WITH WAVE WINDING.
APPLICATION FILED JUNE 8, 1901.

No. 783,498. PATENTED FEB. 28, 1905.
E. ARNOLD & F. COLLISCHONN.
EQUIPOTENTIAL CONNECTIONS FOR ARMATURES FOR DYNAMOS
WITH WAVE WINDING.
APPLICATION FILED JUNE 8, 1901.

Patented February 28, 1905.

UNITED STATES PATENT OFFICE.

ENGELBERT ARNOLD, OF KARLSRUHE, AND FRIEDEL COLLISCHONN, OF FRANKFORT-ON-THE-MAIN, GERMANY.

EQUIPOTENTIAL CONNECTIONS FOR ARMATURES FOR DYNAMOS WITH WAVE-WINDING.

SPECIFICATION forming part of Letters Patent No. 783,498, dated February 28, 1905.

Application filed June 8, 1901. Serial No. 63,785.

*To all whom it may concern:*

Be it known that we, ENGELBERT ARNOLD, professor, a citizen of the German Empire, residing at Karlsruhe, in the Grand Duchy of Baden, and FRIEDEL COLLISCHONN, a subject of the Emperor of Germany, residing at Frankfort-on-the-Main, Germany, have invented new and useful Equipotential Connections for Armatures for Dynamos with Wave-Winding, of which the following is a specification.

It is known that with continuous-current dynamos with loop-winding those nodal points of the winding or those commutator-bars which have a like potential may connect with each other. These connections are called, after the name of the inventor, "Mordey" connections.

The equipotential connections are used, for example, with continuous-current generators, motors, and rotary converters. The connections from the continuous-current winding to the collectors of rotary converters are always equipotential connections.

Let $p$ denote the number of the pairs of poles and $k$ the number of the commutator-bars. So must $\frac{k}{p}$ be a whole number, and $p$ bars, which are distant $\frac{k}{p}$ bars from each other, may be connected with each other. The object attained by the Mordey connections is that they reduce the number of brushes, so that where the latter would not be got at without some difficulty they are simply left out.

The invention here treated of consists in the employment of equipotential connections in the case of electric machines having wave-windings, with the view of affording a means of balance to such inward currents as arise from lack of perfect symmetry or from any other reason without causing such currents to traverse the brushes, and thus give rise to the formation of electric sparks.

In the accompanying drawings, Fig. 5$^a$ is a transverse sectional view through the commutator indicated in Fig. 5 looking toward the armature-winding.

In order to make due application of equipotential connections in the case of wave-winding, it is necessary to observe certain conditions, which conditions are founded on the following calculations.

If $a$ denotes the number of bifurcations of the current through sets of coils that are parallel to each other and $y$ the so-called "pitch" of the winding, so there are $y$ commutator-spaces between the beginning and the end of an armature-coil, and it follows $$k = p \cdot y \pm a \text{ or } y = \frac{k \pm a}{p},$$

because, as later will be stated, the number of commutator-bars which are connected with each other equals $a$, it is good that for the purpose of symmetry $$\frac{k}{a} = \frac{p \cdot y}{a} \pm 1$$

equals a whole number.

If $\frac{k}{a}$ is a whole number, then in every circuit which is formed by means of two cross connections and the armature-coil lying between the ends of the cross connections an equal number of armature-coils is inserted against each other, so that the electromotive forces reciprocally neutralize each other; but if $\frac{k}{a}$ is not a whole number then the inserted armature-coils are not always balanced.

If $\frac{p}{a}$ is a whole number then the condition is satisfied; but this condition cannot on practical grounds be always satisfied. If $\frac{p}{a}$ is not a whole number, there are two methods by which to proceed if it be wished to prevent greater unsymmetries which cause loss of energy in the cross connections.

1. $p \cdot y$ is made divisible by $a$ if $y$ is selected as suitable. In this case a simple closed winding is not obtained, but two or more windings independent of each other. Such a winding is termed a "multiple closed winding" or a "multiple-series winding." The number of independent windings is equal to the common factor of $y$ and $a$. If $y$ is divisible by $a$, then $a$ windings closing in themselves—i. e., $a$ independent windings—are obtained.

2. One or several loops of a loop-winding are interposed between the wave-winding, and a simple closed winding is best to be chosen.

If $z$ denotes the number of interposed loops, the number of commutator-segments $k$ is then increased to $k' = k + z$. Thus $$k' = p \cdot y \pm a + z,$$

and $\dfrac{k'}{a}$ must be a whole number. The pitch of the winding will be $$y = \frac{k' \pm a - z}{p} = \frac{k \pm a}{p}.$$

It thus remains the same as in the first case.

If the number of commutator-spaces or nodal points of the winding which lie between the end points of an equipotential connection be denoted as cross-pitch $y_q$, so $y_q$ must be a whole multiple of the double commutator pole-space, because equal potentials lie asunder a distance which is equal to a multiple of the double commutator pole-space.

We measure the pole-pitch in every case by the number of commutator-segments $k$, because, as above shown, the pitch of the winding will be always expressed by the formula $$y = \frac{k \pm a}{p}.$$

To a double pole-pitch belong $$\frac{k}{p} = \frac{p \cdot y \pm a}{p}$$

commutator-segments.

The cross-pitch $y_q$ shall be exactly as possible an entire multiple of the double pole-pitch. If the letter $x$ stands for the number of double commutator pole-spaces inclosed by a cross-pitch $y_q$, then $x$ is a whole number and we obtain $$y_q = \frac{p \cdot y \pm a}{p} x = x y \pm \frac{a p}{x}. \quad \text{I.}$$

If from this formula we do not obtain a whole number, then it is permitted to round out $y_q$ to a whole number or to a whole number plus one-half—for example, $50\tfrac{1}{2}$. Then $y_q$ is not exactly a whole multiple of the double pole-pitch and is therefore slightly incorrect. This slight incorrectness can also be expressed by the statement that the value $x$ may differ slightly from a whole number. If $y_q$ be a whole number, all cross connections are placed on the same side of the armature; but if there are cross-pitches which are a whole number plus one-half then the cross connections are placed on the front and the hinder side of the armature. The number of the commutator-bars which may be connected with each other equals $a$, and the series of connections of these $a$ bars form a closed figure. The further condition issues therefrom that the sum of the $a$ cross-pitches of a closed series of connections must equal $k$. Thus $$y_{q1} + y_{q2} + y_{q3} + \ldots + y_{qa} = k$$

this condition is satisfied if $$x_1 + x_2 + x_3 + \ldots + x_a = p$$

Therewith that the cross-pitches are equal as nearly as possible one to the other, we choose $x$ equal as nearly as possible $\dfrac{p}{a}$, so that two different values of $x$ shall have a maximum difference of 1. Therefore it is permitted to write $$\frac{a}{p} x = 1$$

and we get $$y_q = x y \pm 1. \quad \text{II.}$$

From this formula II a whole number is immediately obtained, while from the formula I we get as well a mixed number. An example will best make this clear. Let $p = 7$, $a = 3$, $y = 27$, $z = 0$, $k = 7$. $27 + 3 = 192$. If we select $x_1 = 2$, $x_2 = 2$, $x_3 = 3$, then $$y_{q1} = \frac{7 \times 27 + 3}{7} \times 2 = 54 + \frac{6}{7}$$

or $$y_{q1} = 55 = 2 \times 27 + 1$$

$$y_{q2} = \frac{7 \times 27 + 3}{7} \times 2 = 54 + \frac{6}{7}$$

or $$y_{q2} = 55 = 2 \times 27 + 1$$

$$y_{q3} = \frac{7 \times 27 + 3}{7} \times 3 = 82 + \frac{2}{7}$$

or $$y_{q3} = 82 = 3 \times 27 + 1$$

$$y_{q1} + y_{q2} + y_{q3} = 192 = k.$$

We see from this that the winding is triply closed, because $y = 27$ and $a = 3$ have the common factor 3, as above stated.

If in the above example we start from any nodal point or from any commutator-segment, then we must go through $54 + \dfrac{6}{7}$ coils, then again through $54 + \dfrac{6}{7}$ coils to find the other two points of equal potential. If we go, further, through $82 + \frac{2}{7}$ coils, we return to the point from whence we started.

In Figs. 1, 2, 3, and 4 of the drawings, as example, four windings are represented schematically. In these figures, S and N denote the poles; A, the armature-winding; C, the connection to the commutator; K, the commutator; W, the equipotential connections, and B the brushes of the commutator.

For the practical construction it is simpler to round out the value $y_a$ to a whole number. The formula II yields the whole number immediately. The incorrectness amounts in this case to two-sevenths of a commutator-space. If $p$ is divisible by $a$, then this fault disappears.

Figure 1:
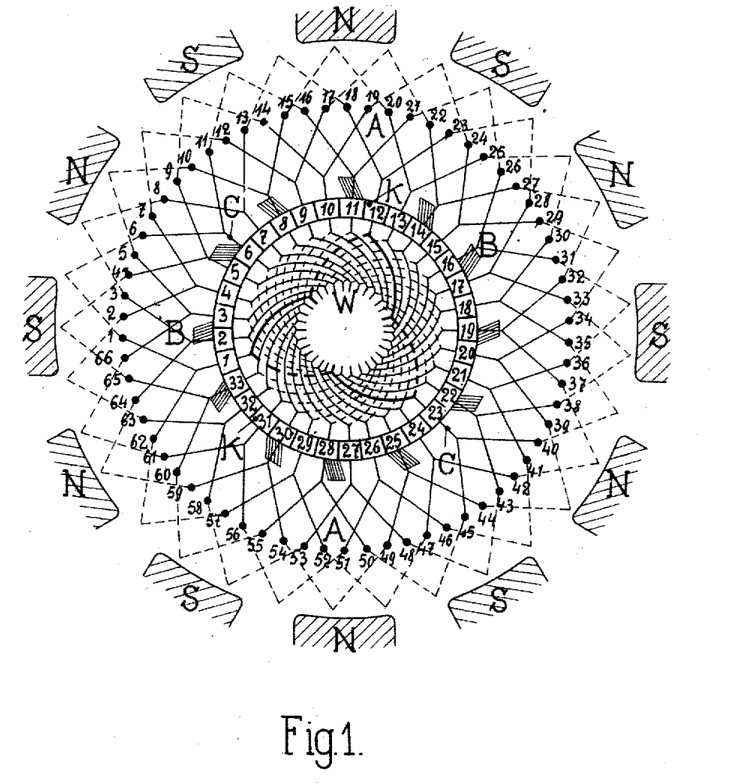
Figures 1, 2, 3, and 4 are schematic representations of cross connections or windings embodying the invention.

In Fig. 1, $p = 6$, $a = 3$, $z = 0$, $k = 33$, $y = 5$. Thus $k = py + a = 5 \times 6 + 3 = 33$. In this case will $x_1 = x_2 = x_3 = 2$ and $$y_{a1} = y_{a2} = y_{a3} = \frac{6 \times 5 + 3}{6} \times 2 = 11.$$

Therefore bar 1 with bar $1+11=12$.
Therefore bar 12 with bar $12+11=23$.
Therefore bar 23 with bar $23+11=34$—i. e., to connect with bar 1, and so on. A completely symmetrical arrangement of cross connections results.

Figure 2:
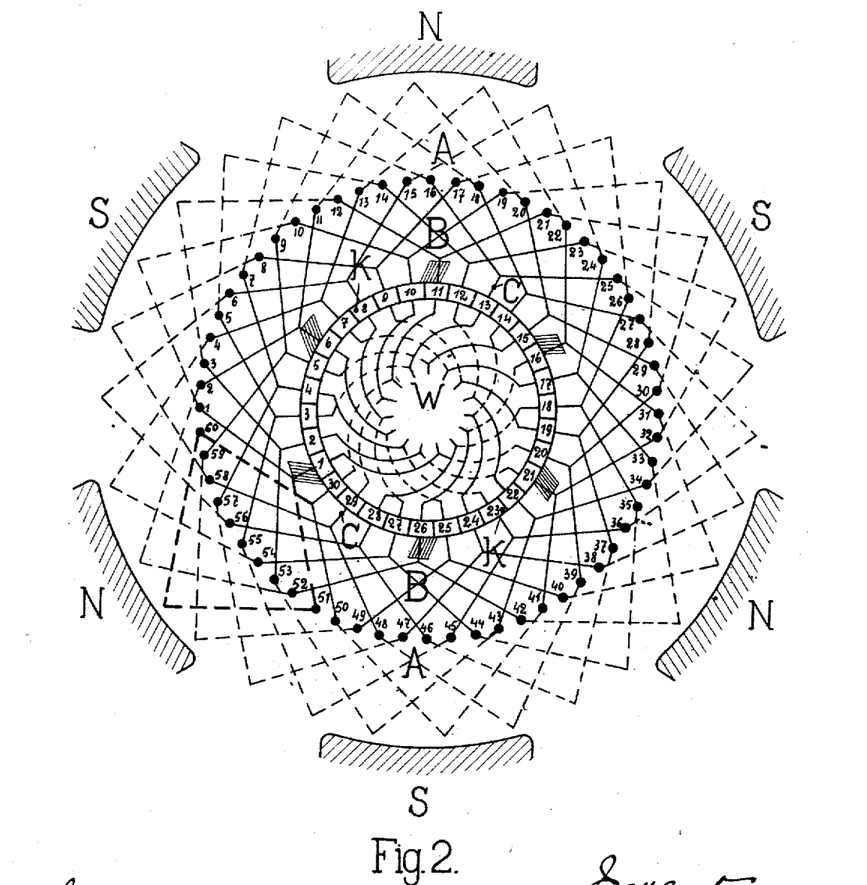

In Fig. 2, $p = 3$, $a = 2$, $z = 1$, $y = 9$;

$$k = py + a = 3 \times 9 + 2 = 29;$$
$$k' = k + z = 30.$$

In this case the wave-winding contains a loop, so that the number of commutator-bars $k'$ may be divisible by the number of bifurcations. In the figure it lies between the commutator-bars 30 and 1 and is formed by means of the lines 30-60-51-1. The calculation of the cross-pitch is as follows:

$$x_1 = 2, x_2 = 1.$$

$$y_{a1} = \frac{py+a}{p} \times x_1 =$$
$$\frac{3 \times 9 + 2}{3} \times 2 = 18 + \frac{4}{3} \sim 19$$

$$y_{a2} = \frac{py+a}{p} \times x_2 =$$
$$\frac{3 \times 9 + 2}{3} \times 1 = 9 + \frac{2}{3} \sim 10$$

because $y_{a1} + y_{a2} = 19 + 10 = k = 29$, and not $= k' = 30$. Therefore in designing the cross connections we must pass over the commutator-segment No. 30, which is connected with the loop. We connect, therefore, commutator-segment 1 with $1 + 19 = 20$, commutator-segment 20 with $20 + 10 = 30$—that is to say, with commutator-segment 1—because the segment 30 is to be passed over. By counting in this way all the segments are connected with the winding. At last we come to segment 30 and making the loop, segment 30 60 51 segment 0, we come back to the segment from which we started.

The cross-pitches 19 and 10 always give two cross connections which unite.

In every circuit which is formed by means of two cross connections and the armature-coils lying between the ends of these cross connections an equal number of armature-coils are inserted against each other, so that the electromotive forces reciprocally neutralize each other. Such a circuit, for example, forms the lines: cross connections 27-8, coils 6-56, 46-37, cross connection 19-9, coils 17-26, 35-44. That becomes possible through the interposition of a loop in the diagram of the winding.

In the example given above the values $x$ are always so selected that their greatest difference is 1. This is not absolutely needed, and it is also not necessary that all cross-pitches which form a closed figure and which connect $a$ bars should be carried out. If the number of poles of the machine is large, that gives many possible ways of carrying out the cross connections.

Figure 3:
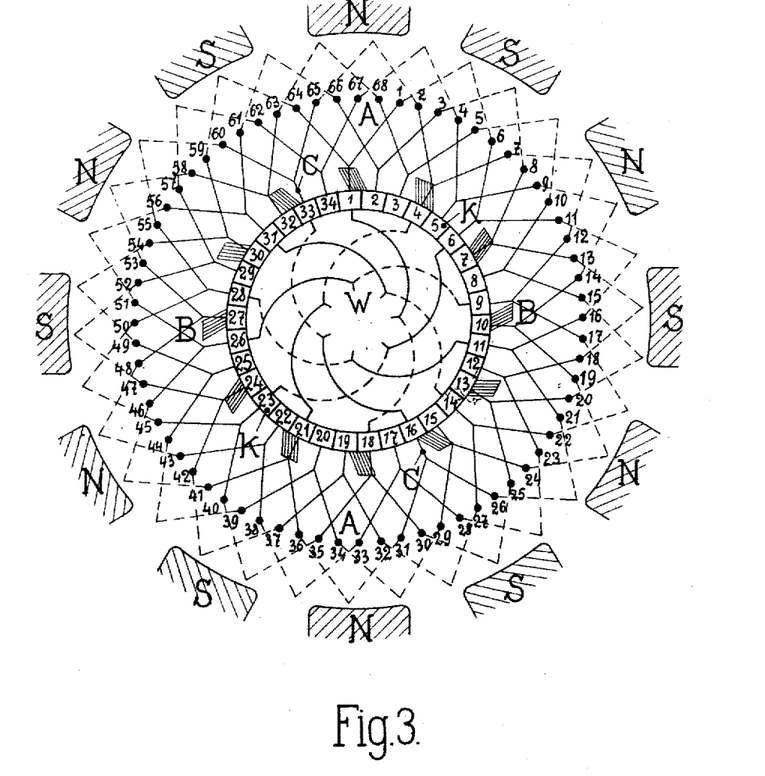

Fig. 3 gives an example of the values:—

$$p = 6, a = 4, z = 0, y = 5$$
$$k = py + a = 6 \times 5 + 4 = 34.$$

We elect $$x_1 = 1, x_2 = 2, x_3 = 1, x_4 = 2,$$

so that $$x_1 + x_2 + x_3 + x_4 = p = 6,$$

and obtain $$y_{a1} = x_1 y + 1 = 1 \times 5 + 1 = 6$$
$$y_{a2} = x_2 y + 1 = 2 \times 5 + 1 = 11 \quad \} y_{a1} + y_{a2} = 17$$
$$y_{a3} = x_3 y + 1 = 1 \times 5 + 1 = 6$$
$$y_{a4} = x_4 y + 1 = 2 \times 5 + 1 = 11 \quad \} y_{a3} + y_{a4} = 17$$

$$y_{a1} + y_{a2} + y_{a3} + y_{a4} = k = 34.$$

We can thus either connect four segments with the four calculated cross-pitches, or we can also simplify the connections by uniting two pitches into one and by only connecting two segments. In Fig. 3 these last connections are displayed. For example, segment 1 with segment $1 + 17 = 18$, segment 4 with segment $4 + 17 = 21$, segment 6 with segment $6 + 17 = 23$, segment 9 with segment $9 + 17 = 26$ is to be connected. In Fig. 3 not all connections possible are represented. The equalizing action of the cross connections is weakened by the said simplification; but in many cases such action is sufficient. If $a$ is greater than $p$, then from the ensuing equation $x_1 + x_2 + x_3 + \ldots + x_a = p$ it follows that at least $a - p$ values of $x$ must be $= 0$. All remaining values of $x$ are then $= 1$. For $x = 0$ we obtain from formula II $y_a = \pm 1$—that is, two commutator-bars next each other may be connected.

Figure 4:
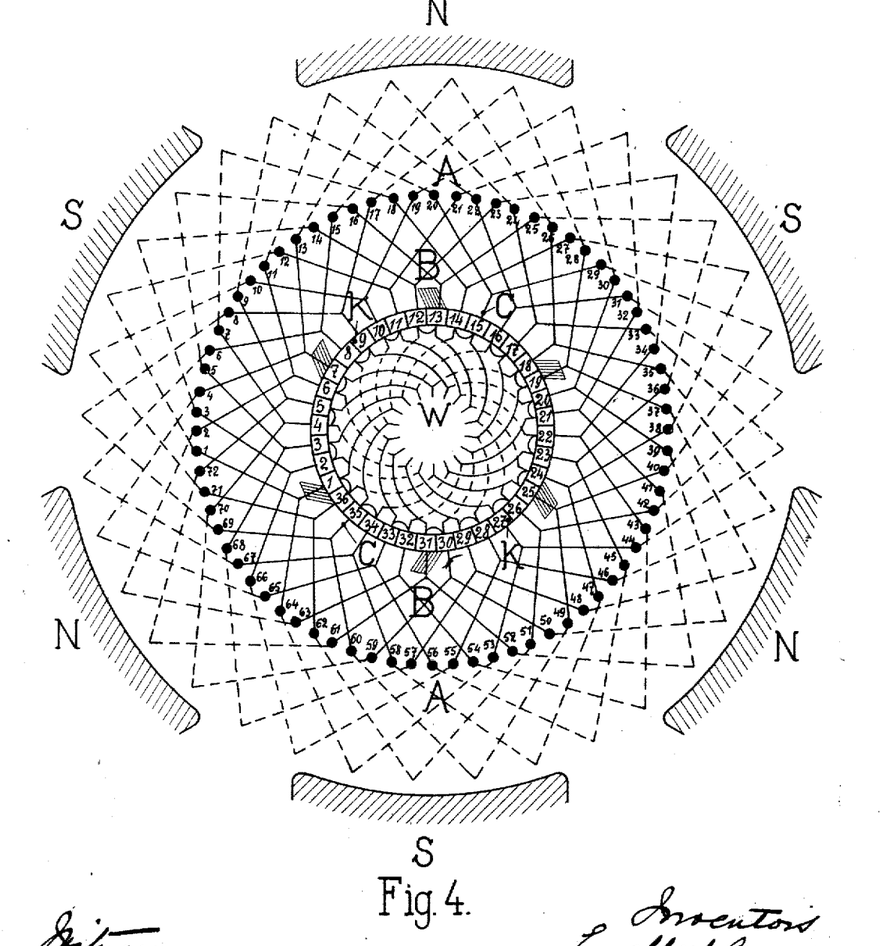

An example herein is given by Fig. 4—*i.e.*, $$p = 3, a = 6, k = 36, y = 10.$$
$$x_1 = 1, x_2 = 0, x_3 = 1, x_4 = 0, x_5 = 1, x_6 = 0.$$
$$x_1 + x_2 + x_3 + x_4 + x_5 + x_6 = p = 3.$$
$$y_{q1} = y_{q3} = y_{q5} = 1.10 + 1 = 11.$$
$$y_{q2} = y_{q4} = y_{q6} = 0.10 + 1 = 1.$$

The cross-pitch $y_q = 1$ for $x = o$ may be positive or negative and has the same sign as $\pm a$ in the formula $k = p \, y \pm a$. In the above case we have $k = 36$, and in the formula II $y_q = x \cdot y \pm 1$ we have to take the positive sign.

Figure 5:
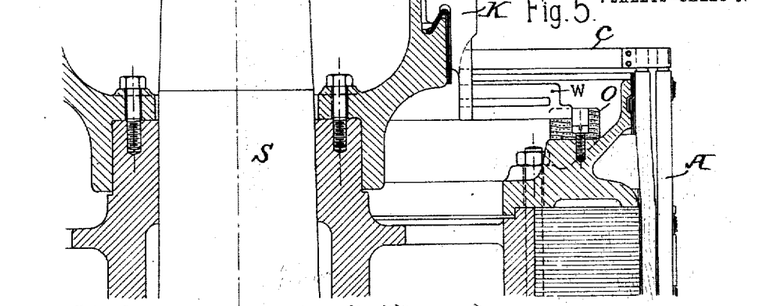
Fig. 5 is a partial longitudinal section through an armature embodying the invention.
Figure 5A:
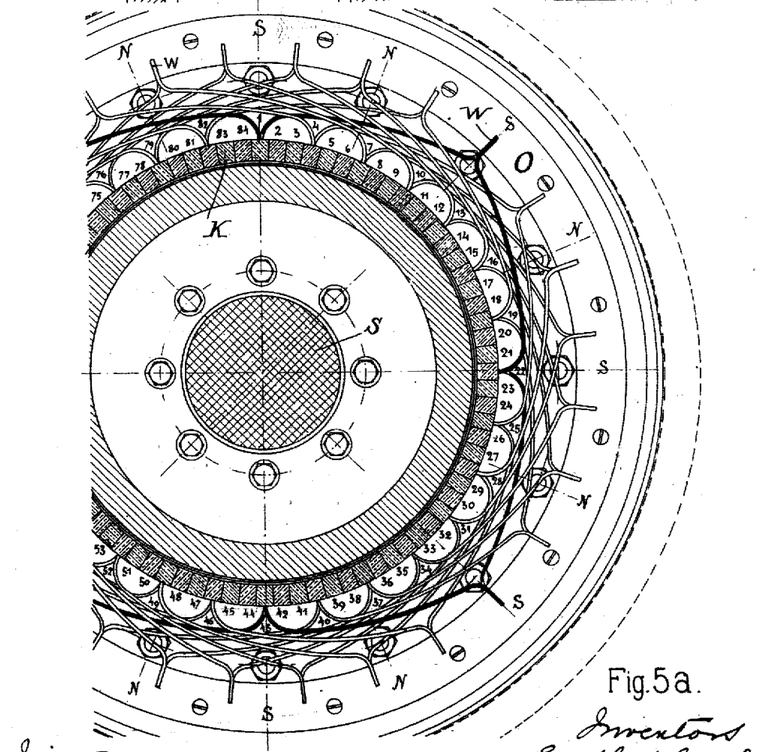
Figure 6:
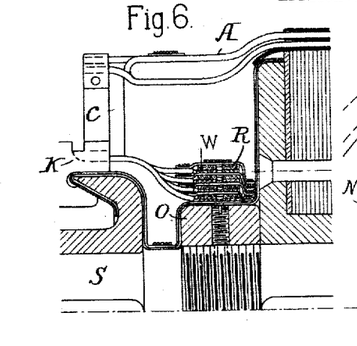
Fig. 6 is a partial longitudinal section, and Fig. 6$^a$ is a partial transverse section, of modification.
Figure 6A:
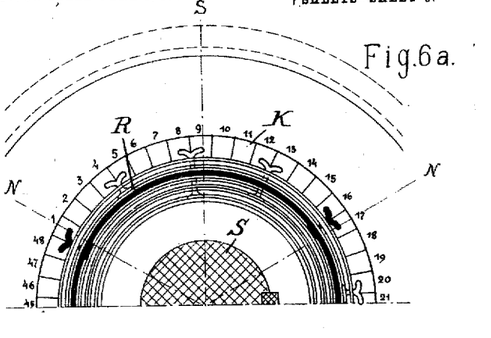
Figure 7:
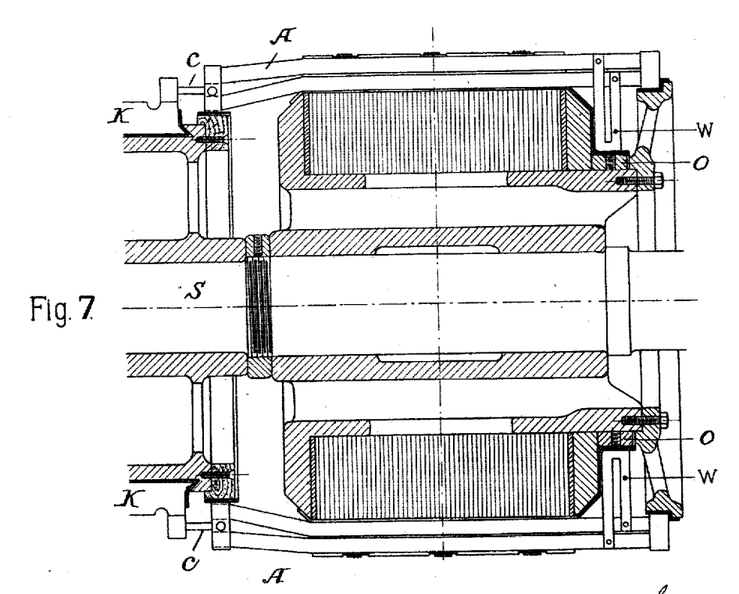
Fig. 7 is a transverse section through an armature embodying another modification.
Figure 8:
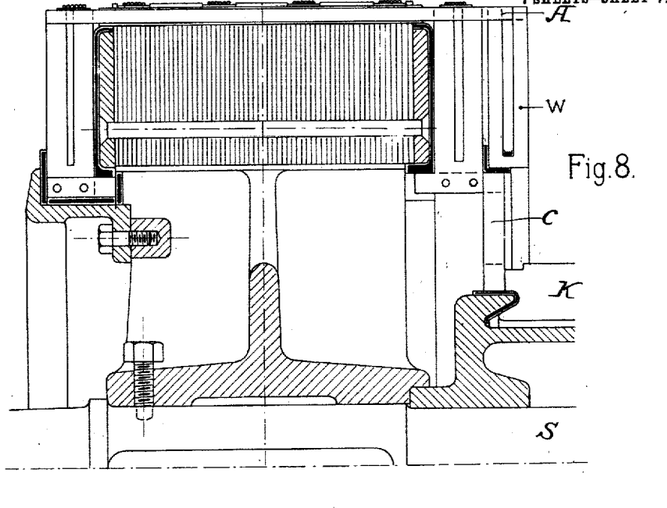
Fig. 8 is a partial longitudinal cross-section showing another modification.
Figure 9:
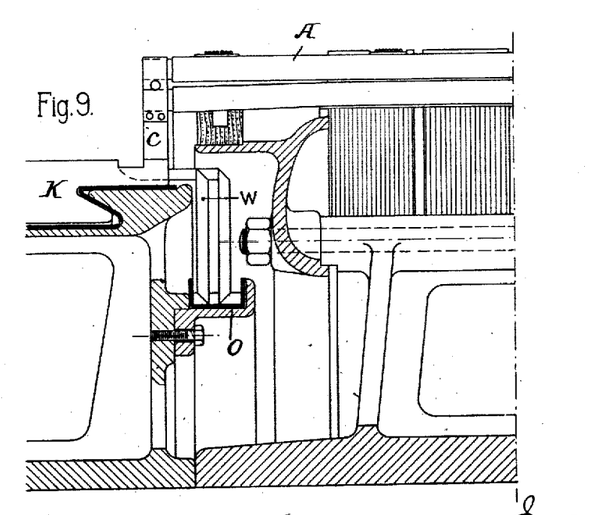
Fig. 9 is a similar partial cross-section showing another modification.

The equipotential connections can be attached in quite a number of different ways—for instance, in the interior of the commutator, as indicated in Fig. 4, Plate 4; so to the side of the armature upward, as shown in Fig. 5, Plate 5, or downward, as in Fig. 6; so to the armature-conductors, as in Fig. 8, between commutator and armature, as in Fig. 9, at the back of armature, as in Fig. 7, or in such other way as the construction of the armature will admit. Thus referring more particularly to Figs. 5 to 9, inclusive, S represents the armature-shaft; A, the armature-winding; K, the commutator, and $c$ the connections from the commutator-sections to the armature-windings, while the equalizing connections W are shown in different forms and relations in the different figures. In Figs. 5 and 5ᵃ the connections W are applied on the commutator behind or within the connection $c$, and these connections consist of V-shaped copper strips W, connecting together two commutator-segments of the same potential. Thus in Fig. 5ᵃ the dark-line connection W is V-shaped and connects segment 1 with segment 22 and segment 22 with segment 43 of the commutator. These V-shaped connections W can be supported by insulated attachments O, mounted on the armature-frame, as indicated in Figs. 5 and 5ᵃ. In Figs. 6 and 6ᵃ the equalizing connections are arranged substantially the same as in Figs. 5 and 5ᵃ, and all the commutator-segments of the same potential are connected by the equalizing connections with bus-rings R, which rings of course are insulated from one another and are shown as fastened to the armature-spider at O. In Fig. 7 the connectors W are applied to the armature-winding A at the back or rear end of the armature and consist of V-shaped copper strips, which are fastened to the armature at O. These strips connect two armature-bars of the same potential. In Fig. 8 the equipotential connections are arranged on the lengthened armature-bars A, and it indicates an armature with radial connections between the bars. In case of very large machines the equipotential connections W can be arranged between the armature and commutator, as shown in Fig. 9, where the connections W are of copper strips connecting two segments of the same potential, but are arranged radiating internally in the opposite manner to that shown in Fig. 5, and they are joined and supported on an insulated attachment O.

The above drawings are sufficient to show the general character of our invention and various ways of embodying it in different structures, and it will be understood that we are not limited to the precise construction and arrangement of parts indicated, as these may be varied by those skilled in the art without departing from the spirit of the invention. The invention does not lie in the peculiar construction of the armatures, but in the use of the equipotential connections for wave-windings arranged and operating substantially as above set forth.

What we claim as our invention, and desire to secure by Letters Patent, is—

1. In an armature, the combination with a wave or multiple-series winding, of cross connections joining nodal points of said winding.

2. In an armature, the combination with a wave or multiple-series winding, of cross connections between nodal points of said winding, said nodal points being separated from one another by approximately a double-pole pitch or a multiple thereof.

3. In an armature, the combination with a wave or multiple-series winding, of cross connections between nodal points of said winding, said nodal points being separated from one another by approximately a double pole-pitch or a multiple thereof, and a commutator having its segments connected to nodal points of said winding.

4. In an armature, the combination with a wave or multiple-series winding, of cross connections between nodal points of said winding, said nodal points being separated from one another by approximately a double pole-pitch or a multiple thereof, and a commutator having its segments connected to nodal-points of said winding, the distance between the centers of two of said segments corresponding to the pitch of a nodal point.

5. In an armature, the combination with a wave or multiple-series winding, of cross connections between nodal points of said winding, the half number of poles of said winding being greater than the number of bifurcations of the current through sets of armature-coils that are in parallel.

6. In an armature, the combination with a wave or multiple-series winding, of cross connections between nodal points of said winding which lie next to one another, the half number of poles of said winding being greater than the number of bifurcations of the current through sets of armature-coils that are in parallel.

7. In an armature, the combination with a wave or multiple-series winding, of cross connections between nodal points of said winding, which nodal points are separated from one another by approximately a double pole-pitch, or a multiple thereof and a sufficient number of loops inserted into said winding so that the total number of nodal points is divisible by the number of bifurcations of the current through sets of armature-coils that are parallel.

8. In an armature, the combination with a wave or multiple-series winding, of cross connections between nodal points of said winding, which nodal points are separated from one another by approximately a double pole-pitch or a multiple thereof and a sufficient number of loops inserted into said winding so that the total number of nodal points is divisible by the number of bifurcations of the current through sets of armature-coils that are parallel, and a commutator each of the segments of which is connected to a nodal point.

In testimony whereof we have signed our names to this specification in the presence of two subscribing witnesses.

ENGELBERT ARNOLD.
  FRIEDEL COLLISCHONN.

Witnesses:
 JACOB ADRIAN,
 H. W. HARRIS.